United States Patent [19]
Grevstad et al.

[11] 3,969,145
[45] July 13, 1976

[54] FUEL CELL COOLING SYSTEM USING A NON-DIELECTRIC COOLANT

[75] Inventors: Paul E. Grevstad, West Hartford; Raymond L. Gelting, Manchester, both of Conn.

[73] Assignee: United Technologies Corporation, Hartford, Conn.

[22] Filed: July 21, 1975

[21] Appl. No.: 597,613

[52] U.S. Cl. .............................................. 136/86 R
[51] Int. Cl.² ........................................ H01M 8/04
[58] Field of Search ............. 136/86 R, 86 B, 86 C, 136/86 E

[56] References Cited
UNITED STATES PATENTS
3,801,374   4/1974   Dews et al. .................. 136/120 FC Primary Examiner—John H. Mack
Assistant Examiner—H. A. Feeley
Attorney, Agent, or Firm—Stephen E. Revis

[57] ABSTRACT

A cooler for removing waste heat from a stack of fuel cells uses a non-dielectric coolant which is carried in a plurality of tubes passing through one or more separator plates in the stack. Preferably the coolant is water so that heat removal is by evaporation of the water within the tubes by boiling. The tubes are electrically insulated from the cells by a coating of dielectric material such as polytetrafluoroethylene. In one embodiment of the present invention the cooler tubes are connected to the stack coolant supply conduits by dielectric hoses having a high length to diameter ratio to provide a several hundred thousand ohm impedance path in case of a flaw in the protective dielectric coating, in order that a short circuit of the stack does not occur.

21 Claims, 4 Drawing Figures

FUEL CELL COOLING SYSTEM USING A NON-DIELECTRIC COOLANT

BACKGROUND OF THE INVENTION

1. Field of the Invention

This invention relates to fuel cells and more particularly to means for removing waste heat from fuel cells.

2. Description of the Prior Art

A fuel cell power section comprises a plurality of individual cells electrically connected in series. The cells convert reactants, such as a hydrogen containing fuel and air or other oxidants, into DC electrical power in a manner well known in the art. The cells are housed between separator plates which provide flow passages to bring the reactants to the cell. The electrochemical reaction produces, as a by-product, waste heat which must be removed in a controlled manner to maintain the cells at the desired operating temperature. For efficient operation it is desirable to maintain the cells at a uniform temperature and at a maximum level consistent with material compatibility characteristics.

A well-known method for removing waste heat from a fuel cell power section is to use heat exchange surfaces parallel to the plane of the cells. These heat exchange surfaces often take the form of passageways through the separator plates forming conduits which carry a coolant fluid. The intimate contact between the coolant fluid and the separator plates provides high heat transfer capabilities between the cells and the cooling medium thereby minimizing the temperature gradient therebetween. Depending upon the power density and thermal properties of the fuel cell power section, coolant passageways could be used between every cell or coolant passageways between one pair of cells could be used to remove heat from several cells, the latter being more typical.

Since the coolant system is an integral part of the power section, it is exposed to the electrical potentials of the cells. In large power sections this can be hundreds or even thousands of volts. It is important, therefore, that there be no appreciable flow of electrical current (i.e., shunt currents) between the cells and ground through the cooling loop. These shunt currents could cause serious corrosion of power section components and/or piping and could result in potentially large parasitic power losses. For this reason fuel cell cooling systems have traditionally used dielectric fluids as the coolant since they cannot conduct electric current. Although this eliminates the problems associated with shunt currents in the cooling loop, there are associated disadvantages. For example, dielectric fluids, such as fluorocarbon or silicon based oils, which are capable of operating at fuel cell temperatures are expensive. The low specific heat of dielectric coolants require high mass flow rates through the cells, with a resultant loss of power due to the energy consumed by the coolant pumps. The higher flow rates require larger flow passage sizes leading to an increase in the size and cost of the power section and its connecting plumbing.

In addition to the foregoing, there are other disadvantages of using dielectric coolants. The amount of heat transferred to the dielectric coolant is a function of the difference between its temperature at the inlet to the cell and its temperature at the exit of the cell. If the cell temperature is not allowed to go above a certain maximum level, a majority of the cell area will necessarily operate at a temperature lower than this maximum temperature resulting in a temperature skew across the cell. This reduces the cell output and overall efficiency. Also, cells are highly sensitive to dielectric fluids. Even trace amounts of a dielectric coolant leaking into the cells can seriously degrade or even totally ruin cell performance. This potential problem is in addition to the fact that the dielectric coolants are flammable and have toxic products of reaction. The foregoing problems are complicated by the fact that dielectric coolants have low surface tension properties which makes them extremely difficult to seal.

SUMMARY OF THE INVENTION

One object of the present invention is a system for cooling fuel cell power sections which avoids the foregoing disadvantages of dielectric coolant systems.

The present invention is a fuel cell cooler for use with a non-dielectric coolant wherein the coolant is carried between cells in tubes and is electrically insulated from the cells. In the preferred embodiment water is used as the coolant.

A cooler of the present invention comprises a plurality of cooler tubes located in the separator plates between cells and/or between groups of cells in a power section or "stack" of cells. The tubes may be made from any dielectric material which can withstand cell operating temperatures and is compatible with the reactants and other cell components. Alternatively, tubes of electrically conductive material may be used if coated with a dielectric material, such as a fluorocarbon polymer, to electrically isolate the tubes and cooling fluid from the separator plate potentials and to protect the conductive tube material from corrosion due to the stack internal environment.

In a preferred embodiment, a further precaution to prevent the flow of appreciable electrical current between the cells and ground (i.e., a short circuit) through the coolant, in case of flaws in the coating or degradation of the coating, includes a high electrical resistance path between the cooler tubes and a grounded cooling water supply system. Each cooler tube or a group of tubes is connected to the stack coolant supply conduits by dielectric hoses having a high length to diameter ratio. This connecting hose configuration, in conjunction with cooling water of low to moderate electrical conductivity is used to provide a several hundred thousand ohm impedance path.

Another feature of a preferred embodiment of the present invention is a sacrificial electrode (i.e., anode) in a nonstructural region of the coolant tubes or coolant manifolds. The cooler system is designed so that a low rate of electrogalvanic corrosion takes place at the sacrificial anode material, thereby ensuring that integrity of structural components of the stack is maintained during the several years that the system is in operation. These and other features of the present invention hereinafter described result in long stack life and predictable operation.

Related U.S. patent applications describing other fuel cell cooling system arrangements are: "Fuel Cell Cooling System" by Carl Reiser and "Fuel Cell Cooling System With Shunt Current Protection" by Paul Grevstad, both filed on even date herewith and of common assignee with the present application.

Having overcome the major obstacles to using a non-dielectric coolant, the properties of water show it to be a superior coolant. Not only is water a very inexpensive coolant, its low boiling point permits the removal of waste heat from the cells by evaporation at practical pressure levels. As the water evaporates it absorbs heat at a constant temperature, thus permitting the cells to operate at a uniform temperature from inlet to exit. Because the boiling temperature of the water is a function of the pressure, the temperature level of the cells may be controlled by varying the pressure level in the water/steam coolant loop. Water's very high heat of evaporation means that large amounts of heat may be transferred per unit of mass of water circulated through the cooler, thereby reducing coolant flow rates by several orders of magnitude as compared to dielectric or non-boiling coolants. This, in turn, results in smaller piping sizes and less parasite power for pumping the coolant. Furthermore, it is not harmful to the cells if small quantities of water leak from the tubes. And, of course, water is not toxic.

The foregoing and other objects, features, and advantages of the present invention will become more apparent in the light of the following detailed description of preferred embodiments thereof as illustrated in the accompanying drawing.

DESCRIPTION OF THE PREFFERRED EMBODIMENT

Figure 1:
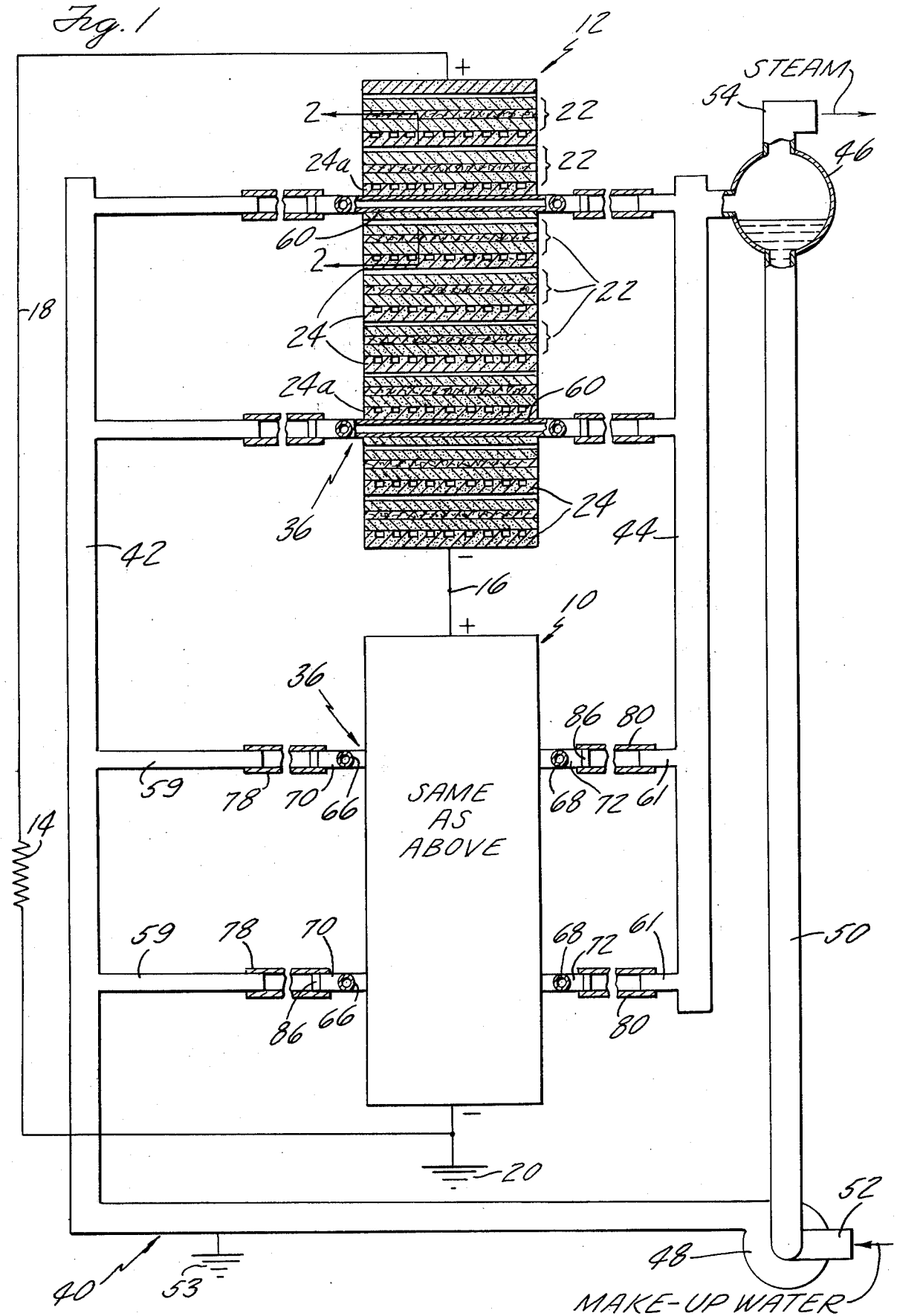
FIG. 1 is a schematic sectional view of part of a fuel cell power plant having two fuel cell stacks connected to each other electrically in series and incorporating the features of the present invention.

As an exemplary embodiment of the present invention, consider the fuel cell power plant cooling system depicted in FIG. 1. The power plant includes a pair of fuel cell stacks 10, 12, respectively. The number of stacks shown is by way of example only, since the present invention is applicable to even a single stack or any larger number of stacks. In this embodiment, and in other embodiments including more than one stack, the stacks are connected electrically in series to each other and across a load 14, such as by the electrical connection 16, 18. The stacks 10, 12 are electrically grounded at 20.

Each stack 10, 12 comprises a plurality of cells 22. Separator plates 24, 24a, which may, for example, be made of graphite, separate each pair of adjacent cells. The plates 24, 24a are electrically conductive and serve to electrically connect the individual cells 22 in series.

Figure 2:
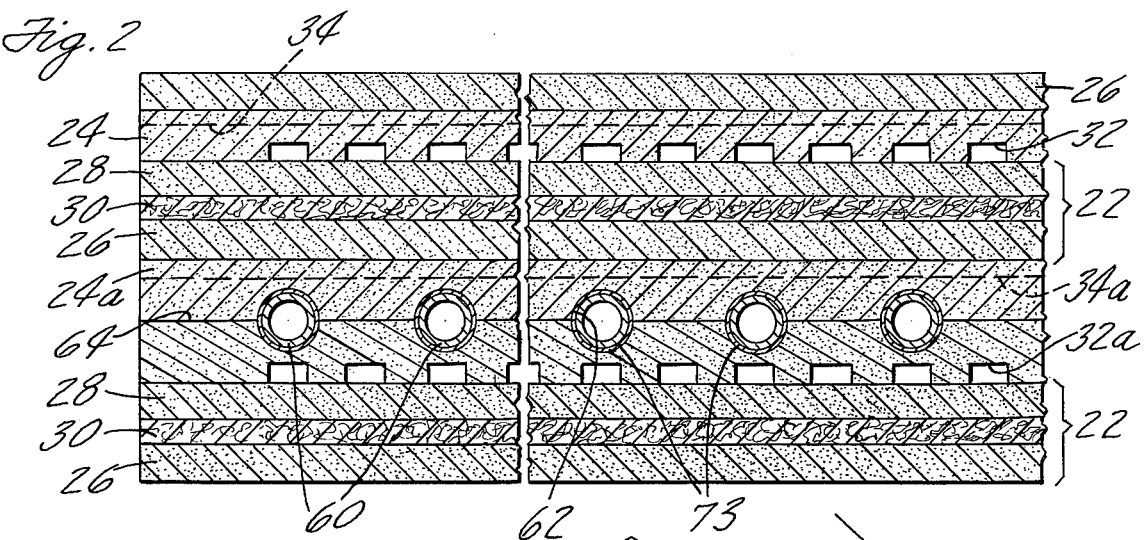
FIG. 2 is an enlarged sectional view taken along the line 2—2 of FIG. 1.

The cells 22 and the plates 24, 24a are best shown in FIG. 2. Each cell 22 comprises an anode electrode 26 spaced apart from a cathode electrode 28 by an electrolyte retaining matrix 30. The electrolyte in this embodiment is phosphoric acid. Channels 32, 32a in the separator plates 24, 24a, respectively, carry an oxidant into communication with the cathode electrodes 28. Channels 34, 34a in the separator plates 24, 24a, respectively, carry a reactant into communication with the anode electrodes 26. The oxidant carrying channels are perpendicular to the reactant carrying channels, each extending from one side of the plate to the other and being fed by manifolds which are not shown. In this embodiment the electrodes are of the well known gas diffusion type suitable for use with air as the oxidant and a hydrogen-containing gas as the reactant. The foregoing description of the cells 22 and the plates 24, 24a are by way of example only, for the purposes of describing this preferred embodiment; it is not intended to limit the scope of the present invention to any particular type of cell or to any specific plate material or configuration.

Returning again to the cooling system of FIG. 1, each stack 10, 12 includes coolers 36. The coolers 36 are designed to carry a non-dielectric coolant into heat transfer relationship with the cells 22 of their respective stack. In this preferred embodiment the coolant is water. The cooling system also includes a circulation system 40. The circulation system 40 includes a coolant supply line 42 for delivering water into the coolers 36; a coolant collection line 44 for collecting the exiting coolant in the form of liquid water and steam exiting from the coolers 36; a steam separator 46 for separating steam from liquid water; a pump 48 for circulating the water through the cooling system; and, a conduit 50 for returning liquid water from the separator 46 to the coolant supply line 42.

The circulation system 40 also includes a conduit 52 for adding make up water to the system. The make up water may come from either a water tank or it may be condensate from other apparatus in the power plant, such as heat exchangers or condensers. The steam portion of the water is shown being carried away from the separator 46 via a conduit 54. The steam may be used in a steam reforming reaction for the production of the hydrogen; or it may simply be condensed and returned into the circulation system via the conduit 52. How this excess steam is utilized is not considered a part of the present invention. The conduits used in the circulation system 40 are electrically conductive (i.e., copper or steel pipe or tubing). These conduits are electrically grounded at 53, but they may be grounded at any number of locations.

Figure 3:
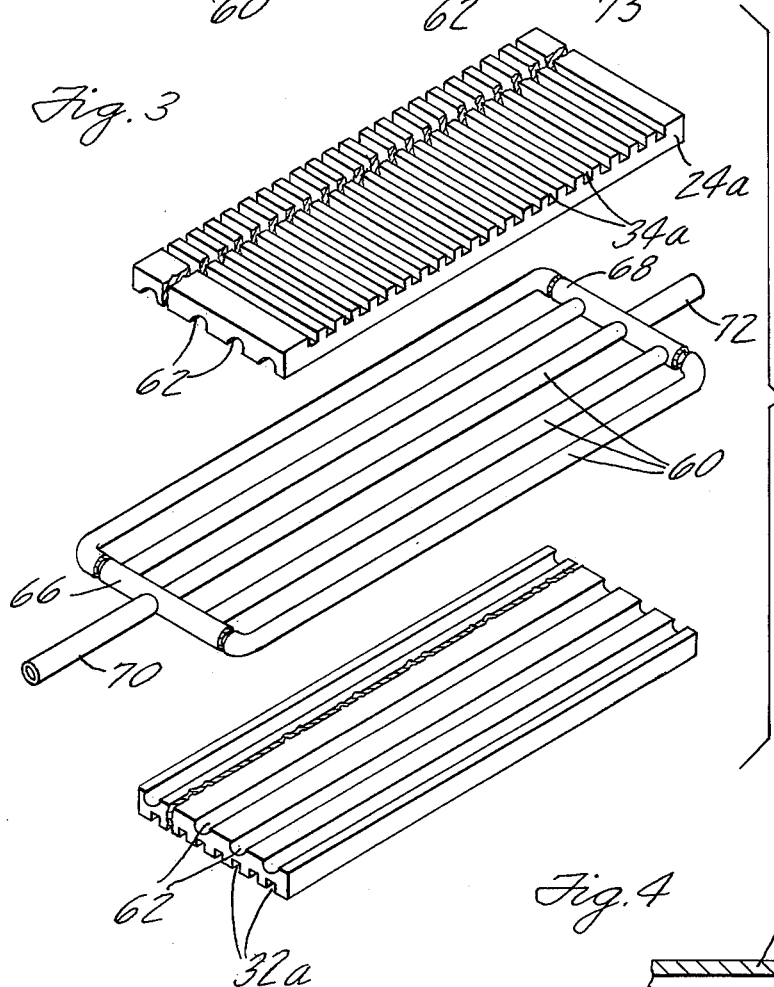
FIG. 3 is an illustrative, exploded, perspective view of a separator plate and cooler tubes of a fuel cell in one of the stacks of FIG. 1.

Each cooler 36 includes conduits 59, 61 connecting it to lines 42, 44, respectively. Each cooler also includes a plurality of cooler tubes 60 which pass through the separator plates 24a. The tubes 60 and plates 24a are clearly shown in FIGS. 2 and 3. The cooler tubes 60 are disposed in passageways 62 formed in the plates 24a. The plates 24a are formed in two halves which divide at a surface 64 for assembly purposes. The tubes 60 are connected by headers 66, 68 (FIG. 3) and have a common inlet end 70 and a common outlet end 72 connected to the conduits 59, 61, respectively. The headers 66, 68 and tube ends 70, 72 are both disposed outside the plates 24a, although this is not mandatory.

Due to manufacturing tolerances it is difficult to avoid air spaces between the tubes 60 and the walls of the passageways 62. Because air is a poor conductor of heat, in order to maximize the heat transfer capability of the system these air spaces are filled with a thermally conductive grease, such as mixtures of polymers and graphite.

The tubes 60 are composed of an electrically conductive material such as copper. In order to prevent electric currents produced in the stacks from passing into the coolant water, thereby resulting in shunt currents which potentially can short circuit the cells and corrode the tubes 60 and other components of the cooling system, the external surfaces of the tubes 60 have a coating 73 of dielectric material. Any dielectric material compatible with the environment of the stacks is suitable. Although in this embodiment the external wall surfaces of the tubes 60 are coated with dielectric material the same result may be achieved by coating the internal wall surfaces of the tubes 60 or by coating the surfaces of the passageways 62 in the plates 24a.

The coating thickness should be sufficient to withstand the potential drop thereacross for the desired life expectancy of the stack; yet it cannot be so thick as to excessively reduce the heat transfer efficiency of the system. In one stack according to the present invention with copper tubes 60 having an inner diameter of 0.085 in. and an outer diameter of 0.125 in. and carrying water as the coolant, it was calculated that a 0.010 in. thick coating of polytetrafluoroethylene (PTFE) on the external surface of the tube could withstand a potential drop of 2000 volts and would perform satisfactorily for at least 40,000 hours. The maximum cell temperature in that calculation was assumed to be 400°F and the electrolyte used in the cells was assumed to be phosphoric acid. Although in this example PTFE is used as the dielectric material, any fluorocarbon polymer would be suitable.

The preferred number and size of the cooler tubes within a separator plate and the number of separator plates carrying cooler tubes may be determined by persons having ordinary skill in the art and is not a part of the present invention. However, one of the important aspects of the present invention is that water may be used as the coolant; and its high heat of evaporation and heat transfer properties result in lower coolant flow rate requirements thereby permitting the use of small diameter cooler tubes and other cooling system conduits. This, in turn, reduces the amount of space heretofore taken up internally and externally of the stack by prior art cooling systems.

In operation, water in liquid form enters the tubes 60 via the conduits 59. Heat produced by the cells 22 changes a portion of the water to steam (i.e., two phase cooling). The steam and water mixture leaves the tubes 60 via the conduits 61 and are fed to the separator 46 wherein the liquid water is retained in the circulating system 40 and the steam is used elsewhere in the power plant.

In this embodiment the graphite separator plates 24, 24a are porous and tend to become saturated with phosphoric acid electrolyte. For this reason the dielectric coating 73 on the tubes 60 must be compatible with phosphoric acid. Also, although not desirable, the electrolyte fills in defects in the dielectric coating, thereby providing a good electrical path to the cooler tubes. In order to assure high reliability, in a preferred embodiment of the present invention the power plant is designed with the assumption that the dielectric coating on one or more cooler tubes is initially defective or will become defective early in the life of the power plant. Assume, for example, that the cooling system, including the coolers and circulating system, is entirely electrically conductive and is electrically grounded. In that instance, a defect in the dielectric coating of a cooler tube could result in a short circuiting of the power plant since electric current from the separator plate might travel into the cooler tube at the location of the defective dielectric coating (either through direct contact or via electrolyte within the defect) and to ground via the coolant and the conduits of the cooling system.

To prevent this from occurring, in the preferred embodiment of FIG. 1 conduits 59, 61 connecting the cooler tube ends 70, 72 to the circulation system 40 are provided with dielectric wall portions 78, 80, respectively. The length to diameter ratio of the dielectric wall portions 78, 80 are chosen such that, should there be a flaw in the dielectric coating, the magnitude of any current flowing in the coolant due to the potential difference between the separator plate 24a and the plenums is reduced to a sufficiently low level which may be 6–8 orders of magnitude less than would be the case without this feature.

Assume, for example, that the dielectric wall portion 78 is a hose made of polytetrafluoroethylene having an inner diameter of 0.178 in. and a length of 5.25 in. Also assume that the water conductivity at operating temperatures is 10 micromhos. Further, assume a potential drop of 300 volts from the cooler tube end 70 to the line 42. The resulting current will be about $36 \times 10^{-6}$ amp. By reducing the current to this low level the problem of shorting the cell is eliminated.

Figure 4:
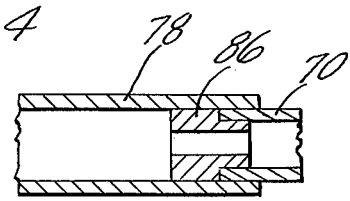
FIG. 4 is an enlarged cross-sectional view of the sacrificial electrode used in the stacks of FIG. 1.

By eliminating the short circuiting problem a corrosion problem arises at the cooler tube ends 70, 72 which are at the high potential end of the high electrical resistance path created by the dielectric wall portions 78, 80. The metal tube ends 70, 72 act as anode electrodes, while the metal portions of the lines 42, 44 at the other ends of the high resistance paths act as cathodes. The rate of corrosion at the tube ends 70, 72 is determined by the resistance of the electrolyte path and the impressed voltage difference. Over the short term this corrosion of the tube ends 70, 72 is very slight due to the small magnitude of the current; yet, over long periods of time (i.e., years) the extent of corrosion can be significant. To protect against this corrosion each of the tube ends 70, 72 includes sacrificial electrode material. This sacrificial material may simply be in the form of additional length for the tube ends; or, as in the preferred embodiment of FIG. 1, it may be an insert 86 (best shown in FIG. 4) of, for example, zinc suitably attached to the cooler tube ends. Any material which corrodes at a lower potential than the tube material could be used as sacrificial electrode material.

To further minimize shunt current magnitude it is also preferable that good quality water be used as the coolant, such as water having a resistivity of at least about 20,000 ohm-cm; however, the minimum acceptable resistivity might be much less when long life is not a factor or if other aspects of the cooling system compensate for low coolant resistivity.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. In a fuel cell cooling system including a stack comprising a plurality of cells connected electrically in series said stack connected electrically to ground and electrically conductive separator plate means disposed between each pair of adjacent cells, an improvement to said stack comprising:
   at least one of said separator plate means including passageways formed therein parallel to the plane of said plate means;

cooler means for carrying an electrically conductive coolant between said cells and including a plurality of cooler tubes disposed in said passageways and passing through said plate means, said tubes comprising electrically conductive wall means;

a dielectric material disposed between said electrically conductive plate means and said electrically conductive wall means adapted to provide an electrical barrier between said plate means and said wall means and Coolant circulation means in fluid Communication with said cooler means.

2. The improvement to said system according to claim 1 wherein said dielectric material is a continuous coating on said wall means.

3. The improvement to said system according to claim 2 wherein said cooler means includes resistance means external of said separator plate means adapted to create a high electrical resistance path through the coolant.

4. The improvement to said system according to claim 3 wherein said cooler means includes sacrificial electrode material disposed at the higher potential end of said resistance path.

5. The improvement to said system according to claim 2 wherein said circulation means is electrically conductive and connected electrically to ground and wherein said cooler means comprises conduit means external of said plate means connecting said circulation means to said cooler tubes, said conduit means comprising a wall of dielectric material having a length to diameter ratio adapted to create a high electrical resistance path through the coolant.

6. The improvement to said system according to claim 5 wherein said cooler means includes sacrificial electrode material adjacent the higher potential end of said resistance path.

7. The improvement to said system according to claim 6 wherein said cooler tubes include an inlet end and an outlet end and said sacrificial material is additional material disposed at least at one of said ends of said cooler tubes.

8. The improvement to said system according to claim 7 wherein each of said ends includes said additional material, and said wall of dielectric material is connected to said ends.

9. The improvement to said system according to claim 8 wherein said additional material comprises an insert disposed in each of said ends comprising a material which corrodes at a lower potential than said cooler tube material.

10. The improvement to said system according to claim 2 wherein said cells include phosphoric acid electrolyte, said dielectric material is a fluorocarbon polymer, and said separator plate means comprises graphite and is porous.

11. In a fuel cell cooling system including a stack comprising a plurality of cells connected electrically in series said stack connected electrically to ground and electrically conductive separator plate means disposed between each pair of adjacent cells, an improvement to said system comprising:

at least one of said separator plate means including passageways formed therein parallel to the plane of said plate means;

cooler means for carrying an electrically conductive coolant between said cells and including a plurality of cooler tubes disposed in said passageways and passing through said plate means, said tubes comprising electrically conductive wall means;

a continuous coating of dielectric material disposed on said electrically conductive wall means and having a thickness sufficient to prevent electric current from passing into the coolant to be carried by said tubes; and a coolant circulation means in fluid communication with said cooler.

12. The improvement to said system according to claim 11 wherein said cooler means includes resistance means external of said separator plate means adapted to create a high electrical resistance path through the coolant.

13. The improvement to said system according to claim 12 wherein said cooler means includes sacrificial electrode material disposed at the higher potential end of said resistance path.

14. The improvement to said system according to claim 11 wherein said dielectric material is between said wall means and said plate means.

15. The improvement to said system according to claim 14 wherein said dielectric material is a fluorocarbon polymer.

16. The improvement to said system according to claim 14 wherein said coolant circulation means is electrically conductive and connected electrically to ground and wherein said cooler means includes conduit means in fluid communication with said circulation means, said conduit means including a dielectric wall portion for creating a high electrical resistance path through the coolant.

17. A fuel cell power plant cooling system comprising:

a non-dielectric coolant;

a load;

electrical connection means;

a plurality of fuel cell stacks connected electrically in series to each other via said electrically connection means and connected electrically in series with said load, said series of stacks being connected electrically to ground, each stack comprising a plurality of cells connected electrically in series and electrically conductive separator plate means disposed between each pair of adjacent cells in each stack, at least one of said separator plate means in each stack including passageways formed therein parallel to the plane of said plate means, each of said stacks including a cooler, said coolant flowing through said cooler, said cooler including cooler tubes disposed within said passageways and passing through said plate means, said tubes comprising electrically conductive wall means, said stack including a dielectric material disposed between said coolant and said plate means;

coolant circulation means connected electrically to ground and in fluid communication with each of said coolers; and dielectric conduit means interconnecting said circulation means and said coolers, said conduit means adapted to create a high electrical resistance path through said coolant, said cooler including sacrificial electrode material in contact with said coolant at the higher potential end of said resistance path.

18. The fuel cell power plant cooling system according to claim 17 wherein said coolant is water.

19. The fuel cell power plant cooling system according to claim 18 wherein said dielectric material is a continuous coating on said wall means.

20. The fuel cell power plant cooling system according to claim 19 wherein said coating is disposed between said wall means and said plate means.

21. The fuel cell power plant cooling system according to claim 20 wherein said coolant circulation means includes pump means to circulate said coolant through said system and coolant separator means, said separator means adapted to receive coolant from said cooler means and to separate coolant in vapor form from coolant in liquid form, and conduit means connecting said separator means to said pump means for recirculating at least a portion of the separated liquid coolant through said coolers.

* * * * *